(12) United States Patent
Kadoya et al.

(10) Patent No.: US 9,849,539 B2
(45) Date of Patent: Dec. 26, 2017

(54) BONDED ARTICLE AND METHOD FOR MANUFACTURING BONDED ARTICLE

(71) Applicant: ORIGIN ELECTRIC COMPANY, LIMITED, Saitama (JP)

(72) Inventors: Yasuo Kadoya, Saitama (JP); Hiroji Sasaki, Saitama (JP)

(73) Assignee: ORIGIN ELECTRIC COMPANY, LIMITED, Saitama (JP)

( * ) Notice: Subject to any disclaimer, the term of this patent is extended or adjusted under 35 U.S.C. 154(b) by 0 days.

(21) Appl. No.: 15/514,633

(22) PCT Filed: Dec. 8, 2015

(86) PCT No.: PCT/JP2015/084405
§ 371 (c)(1),
(2) Date: Mar. 27, 2017

(87) PCT Pub. No.: WO2016/093232
PCT Pub. Date: Jun. 16, 2016

(65) Prior Publication Data
US 2017/0225259 A1    Aug. 10, 2017

(30) Foreign Application Priority Data
Dec. 9, 2014    (JP) .................................. 2014-248916

(51) Int. Cl.
*B23K 11/20*    (2006.01)
*B23K 20/00*    (2006.01)
(Continued)

(52) U.S. Cl.
CPC ............ *B23K 11/002* (2013.01); *B23K 20/00* (2013.01); *B23K 2203/18* (2013.01); *Y10T 428/12493* (2015.01)

(58) Field of Classification Search
CPC ........ B23K 11/02; B23K 11/20; B23K 20/00; B23K 20/12; B23K 2203/04;
(Continued)

(56) References Cited

U.S. PATENT DOCUMENTS 6,419,147 B1    7/2002 Daniel
2007/0158390 A1    7/2007 Anderson et al.

FOREIGN PATENT DOCUMENTS

JP    11-033737 A    *    2/1999
JP    2004-017048 A        1/2004
(Continued)

OTHER PUBLICATIONS

Machine translation of Japan Patent document No. 11-033,737, Aug. 2011.*

(Continued)

*Primary Examiner* — Geoffrey S Evans
(74) *Attorney, Agent, or Firm* — Squire Patton Boggs (US) LLP (57) ABSTRACT

A method for manufacturing a bonded article having long bonding length and high strength. A first bonding target member and a second bonding target member having a hole portion for receiving the first member are provided. Pressing force is applied between the two members with the first member received in the hole portion, and a current is applied to a bonding target portion between the two members with the pressing force applied. The two members are of materials with different melting points. One of the two members, having lower melting point, has a heat capacity increasing portion in the vicinity of the target portion. The one of the members has a taper face at the target portion, and the heat capacity increasing portion has a face extending from the (Continued)

taper face. The force applying step is performed with the other member positioned not to contact the heat capacity increasing portion.

9 Claims, 6 Drawing Sheets

(51) Int. Cl.
*B23K 11/00* (2006.01)
*B23K 103/18* (2006.01)

(58) Field of Classification Search
CPC ............ B23K 2203/06; B23K 2203/18; B23K 11/002; Y10T 428/12493
USPC ......................................................... 219/118
See application file for complete search history.

(56) References Cited

FOREIGN PATENT DOCUMENTS

| JP | 2009-000712 A | | 1/2009 |
|----|---------------|---|--------|
| JP | 2011-177715 A | * | 9/2011 |
| JP | 2011-245512 A | | 12/2011 |
| WO | WO-2012/122842 A1 | * | 9/2012 |

OTHER PUBLICATIONS

Machine translation of Japan Patent document No. 2011-177,715, Aug. 2011.*

* cited by examiner

BONDED ARTICLE AND METHOD FOR MANUFACTURING BONDED ARTICLE

TECHNICAL FIELD

This invention relates to a method for manufacturing a bonded article by pressing a part of one bonding target member into a hole portion of the other bonding target member and solid-phase bonding their bonding target portions to each other, and a bonded article.

BACKGROUND ART

As a method for electrically bonding first and second bonding target members with high bonding strength, ring mash (trademark) bonding, for example, is known (see Patent Documents 1 and 2). This ring mash bonding method includes providing a first bonding target member having a bonding target portion and a second bonding target member having a hole portion with a bonding target portion having an inside diameter which is slightly smaller than the outside diameter of the bonding target portion of the first bonding target member, positioning and placing the first bonding target member on the second bonding target member such that the bonding target portion of the first bonding target member slightly overlaps the bonding target portion of the hole portion of the second bonding target member, and applying a current, in this state, to the first and second bonding target members under pressure until their bonding target portions undergo plastic flow and pressing the bonding target portion of the first bonding target member into the bonding target portion of the hole portion of the second bonding target member to solid-phase bond the first and second bonding target members.

A feature of this ring mash bonding is that because the bonding target portion of the first bonding target member and the bonding target portion of the second bonding target member increase their bonding areas while undergoing plastic flow by the effect of the pressing force and bonding current and a vicinity of an outer peripheral surface of the bonding target portion of the first bonding target member and a vicinity of an inner peripheral surface of the bonding target portion of the second bonding target member are eventually solid-phase bonded to each other with a certain bonding width, high bonding strength can be achieved without being significantly affected by the dirt on the surfaces or the roughness of the surfaces of the bonding target portions. The bonding strength by the ring mash bonding depends on the bonding area, and the bonding area is proportional to the bonding diameter×bonding depth.

RELATED ART DOCUMENT

Patent Document

Patent Document 1 Japanese Patent Application Publication No. 2004-017048
Patent Document 2 Japanese Patent Application Publication No. 2011-245512

DISCLOSURE OF INVENTION

Problem to be Solved by the Invention

When a bonded article electrically bonded by such a ring mash bonding method consists of two different types of metal materials with different melting points or electrical resistances, in particular, when one is made of a metal material having a lower melting point and a higher electrical resistance than the other, an non-bonded (which is hereinafter referred to as "undercut") part may become larger as the push-in depth increases with the progress of plastic flow of the different types of metal materials. The cause of this is that the bonding target portion of the one metal material undergoes sufficient plastic flow while the plastic flow of the bonding target portion of the other metal material with a higher melting point is still insufficient because the one metal material has a lower melting point than the other, in particular, and the bonding target portion of the one bonding target members with a lower melting point readily undergoes plastic flow.

Thus, when ring mash bonding is performed on a combination of different types of metal materials, such as a cast iron with an especially low melting point and a high electrical resistance and an alloy steel having a higher melting point and a lower electrical resistance than the cast iron, it is conventionally difficult to obtain an effective bonding length of about 3 mm or longer. For example, when one of the bonding target members is made of a cast iron A and the other bonding target member is made of an alloy steel B, the cast iron A undergoes plastic flow more readily and generates larger amount of heat than the alloy steel B because the cast iron A has a lower melting point and a higher electrical resistance than the alloy steel B. Thus, in the initial stage of ring mash bonding, the bonding target portion of the cast iron A starts undergoing plastic flow earlier than the bonding target portion of the alloy steel B, whereas, at this time, the bonding target portion of the alloy steel B has not started undergoing plastic flow. With the progress of bonding, the plastic flow of the bonding target portion of the cast iron A proceeds rapidly whereas the plastic flow of the bonding target portion of the alloy steel B delays.

In the process in which the cast iron A is pressed into the alloy steel B during ring mash bonding, in other words, during the progress of ring mash bonding, the bonding target portion of the cast iron A undergoes excessive plastic flow compared to the bonding target portion of the alloy steel B and the plastic flow of the bonding target portion of the alloy steel B delays at a later stage of ring mash bonding. Thus, that part of the bonding target portion of the cast iron A which has undergone plastic flow is not solid-phase bonded to the bonding target portion of the alloy steel B but flows. In particular, at a later stage of ring mash bonding, because the bonding target portion of the alloy steel B becomes an insufficient plastic flow state compared to that of the cast iron A, a part from which an oxidation film, which hinders solid phase bonding, is not removed is formed. As a result, desirable solid phase bonding is not achieved and a large undercut that does not substantially contribute to solid phase bonding is formed. Thus, even when the press-in depth, the depth by which the cast iron A is pressed into the alloy steel B, is increased, the effective bonding length cannot be increased. The problem is that there is a desire to obtain high bonding strength even in such a case. This problem also occurs when the alloy steel B is pressed into a hole portion of the cast iron A.

To solve the above problem, the present invention is characterized by including a heat capacity increasing portion that increases the heat capacity in the vicinity of the bonding target portion of one bonding target member so that the one bonding target members does not undergo plastic flow too early and too excessively compared to the other bonding target member when the one bonding target member is made of a metal material having a lower melting point than the other bonding target member, especially, when the one bonding target member is made of a metal material having a lower melting point and a higher electrical resistance. The heat capacity increasing portion is provided at a position where nothing is provided as unnecessary in a conventional article from the standpoint of reducing the size and weight of component parts.

Means for Solving the Problem

A method of the first aspect for manufacturing a bonded article, as shown in FIG. 1A, FIG. 5A, FIG. 5B, FIG. 6 for example, comprises the steps of: providing a first bonding target member 1 (S2); providing a second bonding target member 2 to be bonded to the first bonding target member 1, the second bonding target member 2 having a hole portion 2A that can receive a part of the first bonding target member 1 (S3); applying a pressing force between the first and second bonding target member 1, 2 with the part of the first bonding target member 1 received in the hole portion 2A (S4); and applying a bonding current to a bonding target portion between the first and second bonding target members 1, 2 with the pressing force being applied thereto (S5); wherein the first and second bonding target members 1, 2 are made of metal materials with different melting points; one 1 of the first and second bonding target members 1, 2, whichever has a lower melting point, has a heat capacity increasing portion 1C for increasing the heat capacity thereof in the vicinity of the bonding target portion; the one 1 of the bonding target members has a taper face 1A at the bonding target portion, and the heat capacity increasing portion 1C has a face extending from the taper face 1A; and the step of applying a pressing force (S4) is carried out with the other 2 of the first and second bonding target members 1, 2 positioned not to contact the heat capacity increasing portion.

Figure 5A:
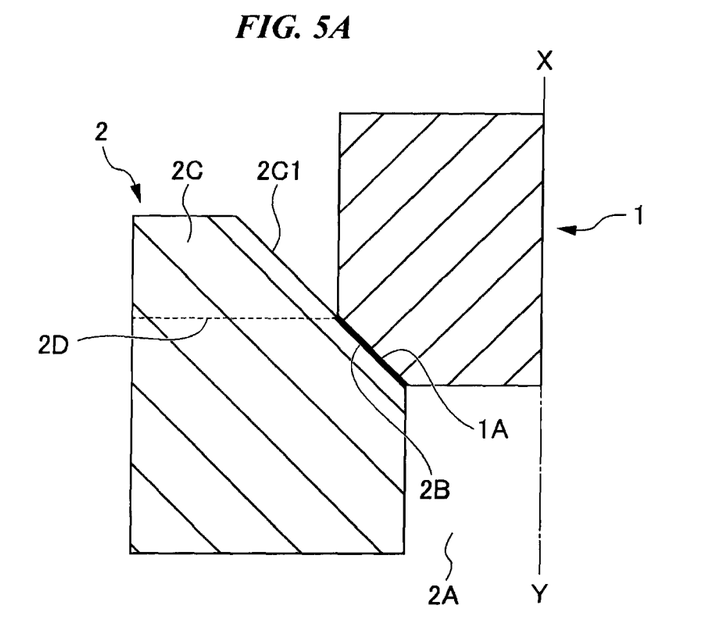
FIG. 5A is a cross-sectional view of bonding target members according to a third embodiment of the present invention.
Figure 5B:
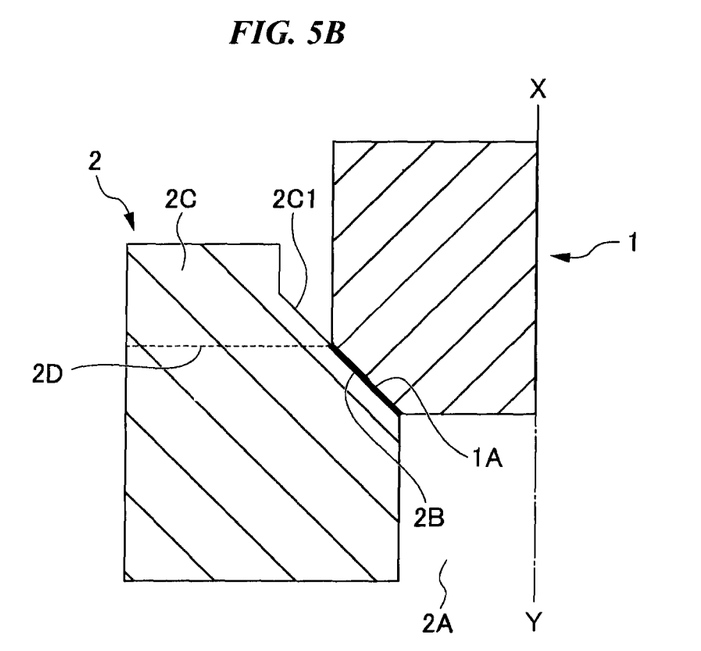
FIG. 5B is a cross-sectional view of bonding target members according to another example of a third embodiment of the present invention.
Figure 6:
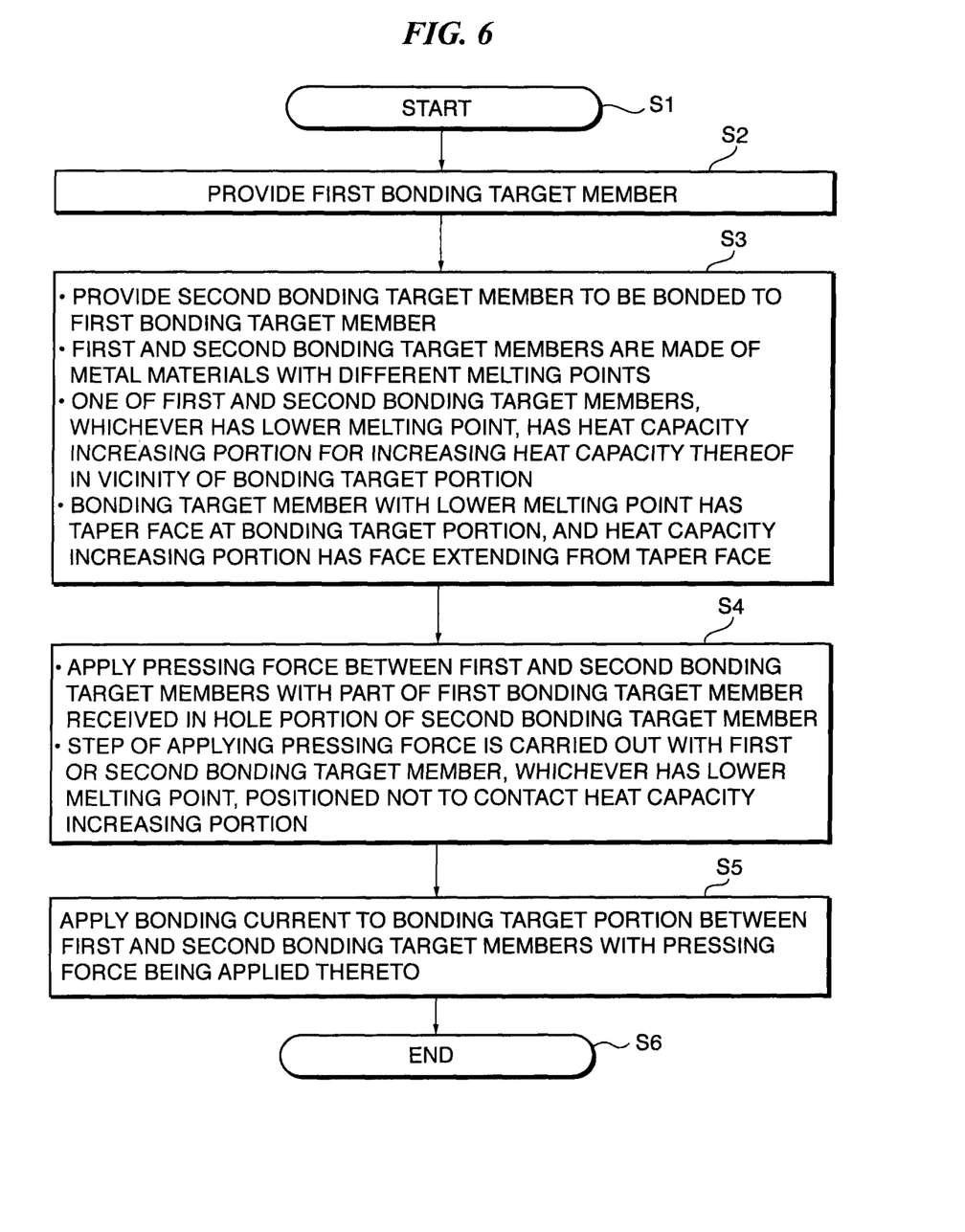
FIG. 6 is a flowchart explaining a method for manufacturing a bonded article according to the embodiments of the present invention.

In case as shown in FIG. 5A and FIG. 5B for example, one 2 of the first and second bonding target members 1, 2, whichever has a lower melting point, has a heat capacity increasing portion 2C for increasing the heat capacity thereof in the vicinity of the bonding target portion; the one 2 of the bonding target members has a taper face 2B at the bonding target portion, and the heat capacity increasing portion 2C has a face extending from the taper face 2B; and the step of applying a pressing force is carried out with the other 1 of the first and second bonding target members 1, 2 positioned not to contact the heat capacity increasing portion 2C.

Figure 1A:
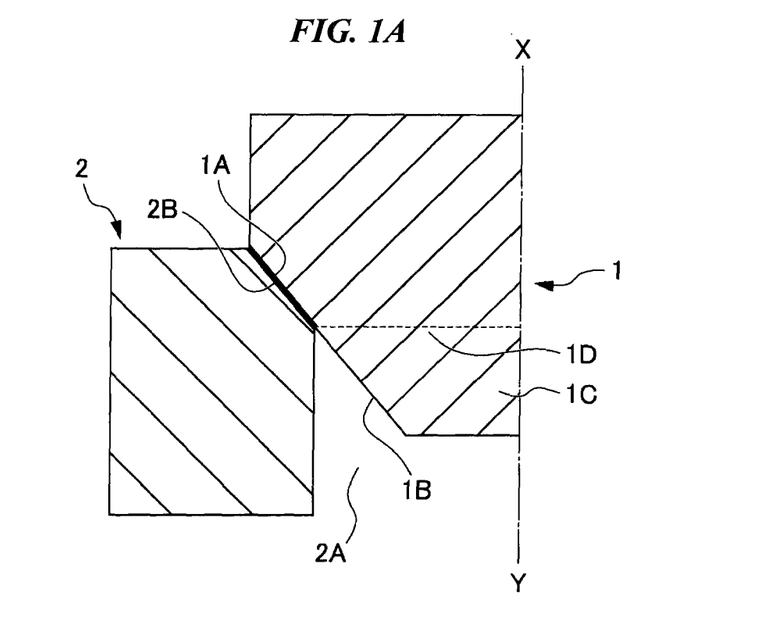
FIG. 1A is a cross-sectional view for explaining bonding target members, showing bonding target members according to a first embodiment of the present invention.

A method of the second aspect for manufacturing a bonded article is, as shown in FIG. 1A for example, the method according to the first aspect, wherein the one 1 of the bonding target members has a higher electrical resistance than the other 2 of the bonding target members 1, 2.

A method of the third aspect for manufacturing a bonded article is, as shown in FIG. 1A for example, the method according to the first or second aspect, wherein the heat capacity increasing portion has an inclined face 1B extending continuously from the taper face.

Figure 4A:
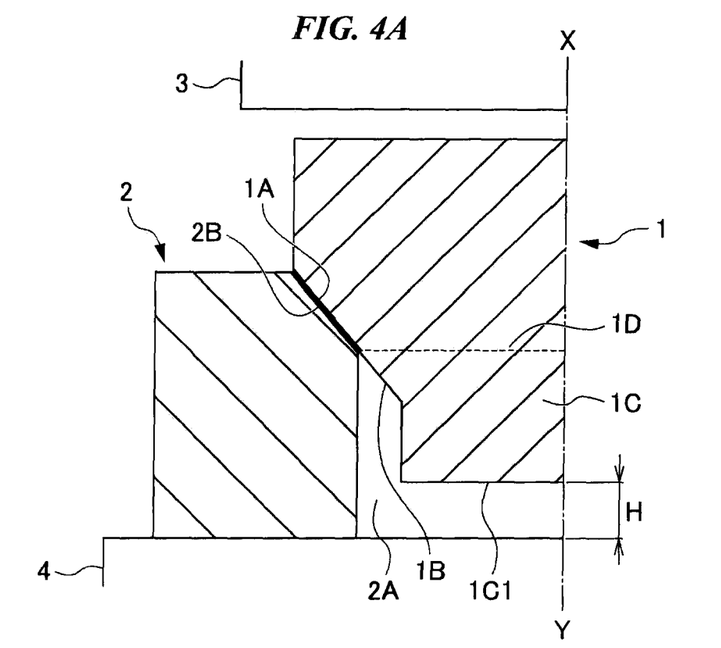
FIG. 4A is a cross-sectional view of bonding target members according to a second embodiment of the present invention, showing the bonding target members before bonding.
Figure 4B:
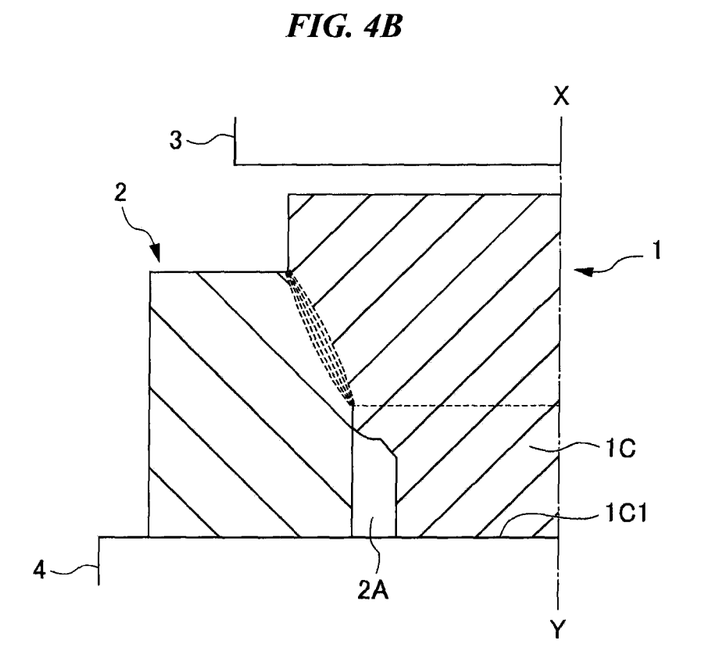
FIG. 4B is a cross-sectional view of bonding target members according to a second embodiment of the present invention, showing the bonding target members after bonding.

A method of the fourth aspect for manufacturing a bonded article is, as shown in FIG. 4A and FIG. 4B for example, the method according to any one of the first to third aspects, wherein the heat capacity increasing portion 1C has a stopper function that stops displacement of the first bonding target member 1 in the hole portion 2A of the second bonding target member 2 during bonding at a predetermined position.

A method of the fifth aspect for manufacturing a bonded article is the method according to any one of aspects 1 to 4, wherein the heat capacity increasing portion 1C is formed of a metal material with a good heat conductivity that is separate from the one of the bonding target members.

A bonded article of the sixth aspect comprises, as shown in FIG. 1A for example, a second bonding target member 2 having a hole portion 2A that can receive a part of a first bonding target member 1; and a first bonding target member 1 bonded to the second bonding target member 2 at a bonding target portion, with the part of the first bonding target member 1 received in the hole portion 2A of the second bonding target member 2, wherein the first and second bonding target members 1, 2 are made of metal materials with different melting points; one 1 of the first and second bonding target members 1, 2, whichever has a lower melting point, has a heat capacity increasing portion 1C that increases the heat capacity thereof in the vicinity of the bonding target portion; the one 1 of the bonding target members 1, 2 has a taper face 1A at the bonding target portion, and the heat capacity increasing portion 1C has a face 1B extending from the taper face 1A; and the first and second bonding target members 1, 2 are positioned such that the other 2 of the first and second bonding target members 1, 2 does not contact the heat capacity increasing portion 1C.

The heat capacity increasing portion enables easy production of a bonded article with less generation of spatter or the like that may occur during the production and with a longer effective bonding length and higher bonding strength than similar conventional articles.

Here, the bonded article of the sixth aspect may be manufactured as described below. As shown in FIG. 1A for example, it comprises a second bonding target member 2 having a hole portion 2A that can receive a part of a first bonding target member 1; a first bonding target member 1 bonded to the second bonding target member 2 by applying a pressing force between the first bonding target member 1 and the second bonding target member 2 with a part of the first bonding target member 1 received in the hole portion 2A and applying a bonding current to a bonding target portion between the first bonding target member 1 and the second bonding target member 2 with the pressing force being applied thereto;
wherein the first and second bonding target members 1, 2 are made of metal materials with different melting points; one 1 of the first and second bonding target members 1, 2, whichever has a lower melting point, has a heat capacity increasing portion 1C that increases the heat capacity thereof in the vicinity of the bonding target portion; the one 1 of the bonding target members 1, 2 has a taper face 1A at the bonding target portion, and the heat capacity increasing portion 1C has a face 1B extending from the taper face 1A; and the first and second bonding target members 1, 2 are positioned such that the other 2 of the first and second bonding target members 1, 2 does not contact the heat capacity increasing portion 1C. The heat capacity increasing portion enables production of a bonded article with less generation of spatter caused by melting and production of a bonded article with a longer bonding length. For example, a bonding length of 3 mm or longer is obtained in the combination of a cast iron and an alloy steel.

A bonded article of the seventh aspect comprises, as shown in FIG. 1A for example, the bonded article according to aspect 6, wherein the heat capacity increasing portion 1C has an inclined face 1B extending continuously from the taper face 1A.

Effect of the Invention

According to the present invention, it is possible to increase the effective bonding length and bonding strength of a bonded article when different types of metal materials with different melting points or electrical resistances are bonded to each other by applying a pressing force and a bonding current.

BEST MODE FOR CARRYING OUT THE INVENTION

This application is based on the Patent Application No. 2014-248916 filed on Dec. 9, 2014 in Japan, the contents of which are hereby incorporated in its entirety by reference into the present application, as part thereof.

The present invention will become more fully understood from the detailed description given hereinbelow. The other applicable fields will become apparent with reference to the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the patent claims constitute, therefore, a part of the present invention in the sense of doctrine of equivalents.

A bonding method according to a first implement of the present invention is a ring mash bonding method in which a pressing force and a bonding current are applied between a first bonding target member and a second bonding target member having a hole portion that can receive a part of a first bonding target member with the part of the first bonding target member received in the hole portion to solid-phase bond the first and second bonding target members to each other, in which the first and second bonding target members are made of metal materials with different melting points; and the first bonding target member has a taper face that can be received in the hole portion of the second bonding target member and includes a heat capacity increasing portion having a face extending from the taper face, the heat capacity increasing portion having an outside diameter that is smaller than the inside diameter of the hole portion, and the solid phase bonding is carried out with the heat capacity increasing portion positioned in the hole portion of the second bonding target member such that it does not substantially contact the second bonding target member when the first bonding target member has a lower melting point than the second bonding target member, or the second bonding target member has a taper face at an entrance part of the hole portion and includes an annular heat capacity increasing portion having a face extending from the taper face, the heat capacity increasing portion having an inside diameter that is larger than the diameter of the first bonding target member, and the solid phase bond is carried out with the first bonding target member positioned on the taper face of the second bonding target member such that the first bonding target member does not substantially contact the heat capacity increasing portion when the second bonding target member has a lower melting point than the first bonding target member. According to this implement, the first and second bonding target members with different melting points can be bonded by ring mash bonding with high bonding strength. A bonding method according to a second implement of the present invention is the bonding method of the first implement, in which the first bonding target member has a higher electrical resistance than the second bonding target member when the first bonding target member has a lower melting point than the second bonding target member, and the second bonding target member has a higher electrical resistance than the first bonding target member when the second bonding target member has a lower melting point than the first bonding target member. According to the second implement, the bonding strength between different types of metals with different melting points and electrical resistances, which are considered difficult to bond to each other, can be improved. A bonding method according to a third implement of the present invention is the bonding method of the first or second implement, in which the heat capacity increasing portion has an inclined face extending continuously from the taper face of the first bonding target member with a lower melting point or the second bonding target member with a lower melting point. According to the third implement, different types of metals can be bonded to each other by ring mash bonding with higher bonding strength. A bonding method according to a fourth implement of the present invention is the bonding method of any one of the first to third implements, in which the heat capacity increasing portion has a stopper function that stops displacement of the first bonding target member in the hole portion of the second bonding target member during bonding at a predetermined position. According to the fourth implement, the bonding strength of the bonded articles can be made uniform, and it is possible to prevent the bonded target members from becoming harder by the effect of the generated heat and reduce the generation of spatter. A bonding method according to a fifth implement of the present invention is the bonding method of any one of the first to third implements, in which the heat capacity increasing portion is formed of a metal material with good heat conductivity that is separate from the first or second bonding target member, whichever has a lower melting point. According to the bonding method of the fifth implement, the bonding strength can be improved without changing the shape or size of the first or second bonding target member, whichever has a lower melting point. A bonded article according to a sixth implement of the present invention is a bonded article obtained by bonding a first bonding target member and a second bonding target member having a hole portion that can receive a part of a first bonding target member to each other by ring mash bonding achieved by applying a pressing force and a bonding current between the first and second bonding target members with the part of the first bonding target member received in the hole portion, in which the first and second bonding target members are made of metal materials with different melting points; and the first bonding target member has a taper face that can be received in the hole portion of the second bonding target member and includes a heat capacity increasing portion having a face extending from the taper face, the heat capacity increasing portion having an outside diameter that is smaller than the inside diameter of the hole portion when the first bonding target member has a lower melting point than the second bonding target member, or the second bonding target member has a taper face at an entrance part of the hole portion and includes an annular heat capacity increasing portion having a face extending from the taper face, the heat capacity increasing portion having an inside diameter that is larger than the diameter of the first bonding target member when the second bonding target member has a lower melting point than the first bonding target member. According to the sixth implement, a bonded article with high bonding strength can be obtained. A bonded article according to a seventh implement of the present invention is the bonded article of the sixth implement, in which the heat capacity increasing portion has an inclined face extending continuously from the taper face of the first bonding target member with a lower melting point or the second bonding target member with a lower melting point. According to the seventh implement, a bonded article with higher bonding strength can be obtained. Embodiments of the present invention are described in further detail below.

First Embodiment

Figure 1B:
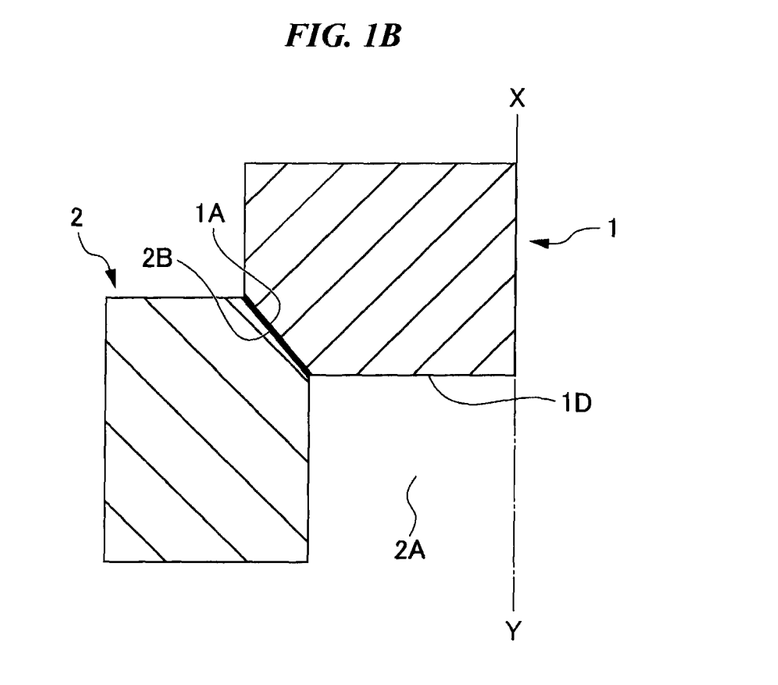
FIG. 1B is a cross-sectional view for explaining bonding target members, showing conventional bonding target members.

FIG. 1A shows a cross-sectional structure, only on one side of a central axis X-Y, of a first bonding target member 1 and a second bonding target member 2 before bonding that constitute a bonded article according to a first embodiment of the present invention. FIG. 1B shows a cross-sectional structure, on one side of a central axis X-Y, of a first bonding target member 1 and a second bonding target member 2 before bonding that constitute a conventional bonded article. The effect of the present invention is particularly remarkable when the first bonding target member 1 is made of a metal material having a lower melting point and a higher electrical resistance than the second bonding target member 2. However, because the bonding target members undergo plastic flow by the effect of heat that is generated by the contact resistance of the contact surface between the bonding target members in ring mash bonding, the effect of the present invention is achieved as long as the first bonding target member 1 is made of a metal material having a lower melting point than the second bonding target member 2. The first bonding target member 1 and the second bonding target member 2 are not limited to the metal materials in the following embodiments.

First, ring mash bonding according to a first embodiment of the present invention is described with reference to FIG. 1A to FIG. 3. The first bonding target member 1 is made of a cast iron, an iron-carbon alloy having a large carbon content, and has a cylindrical columnar shape. A cast iron has a melting point that is approximately 300° C. lower than that of pure iron. The second bonding target member 2 is made of an alloy steel obtained by adding a certain amount or more of an alloy element, such as chromium, to a carbon steel and has a cylindrical shape. The melting point of the second bonding target member 2, which is close to that of pure iron, is approximately 300° C. higher than that of the first bonding target member 1. Although it depends on the temperature, the electrical resistance (volume resistance) of a cast iron is approximately a few to five times higher than that of an alloy steel. Thus, because the first bonding target member 1 has a lower melting point than the second bonding target member 2 and generates a larger amount of heat than the second bonding target member 2, the first bonding target member 1 naturally undergoes plastic flow readily compared to the second bonding target member 2 when a bonding current is applied with the first bonding target member 1 and the second bonding target member 2 in contact with each other.

As shown in FIG. 1A and FIG. 1B, in the ring mash bonding, the second bonding target member 2 has a bonding hole 2A with a diameter that is slightly smaller than the diameter of the first bonding target member 1. The difference between the diameters defines an overlap allowance (when the term "overlap allowance" is used, it means the difference between the radii) which is a metal part that will form at least a bonding target portion. For comparison between the bonding results of the bonding target members shown in FIG. 1A and FIG. 1B, the gradient of a taper face 1A of the first bonding target member 1 is the same and the diameter of the first bonding target member 1 are set to the same for both cases. Also, the gradient and length of a taper face 2B formed at the entrance of a hole portion 2A of the second bonding target member 2 are the same for both cases.

The difference between FIG. 1A and FIG. 1B is that the taper face 1A of the first bonding target member 1 according to the first embodiment of the present invention shown in FIG. 1A extends downward further than that of a conventional first bonding target member 1 shown in FIG. 1B to form an inclined face 1B that extends downward without contacting the taper face 2B of the hole portion 2A of the second bonding target member 2 when the first bonding target member 1 and the second bonding target member 2 are positioned before bonding. Here, the part having the inclined face 1B extending downward is referred to as "heat capacity increasing portion 1C." The gradient of the inclined face 1B is not necessarily equal to that of the taper face 1A as long as the heat capacity increasing portion 1C extends with an arbitrary gradient from a lower end of the taper face 1A. In other words, the difference between the first bonding target member 1 according to the present invention and the conventional first bonding target member 1 is that the first bonding target member 1, having a larger outside diameter than the inside diameter of the hole portion 2A of the second bonding target member 2, according to the present invention includes the heat capacity increasing portion 1C, which extends from a lower end of the taper face 1A with an arbitrary gradient, on a lower end face 1D of the conventional first bonding target member 1 in FIG. 1B. In FIG. 1A, the lower end face 1D is also a face corresponding to an upper face of the heat capacity increasing portion 1C.

In each drawing, the taper face 1A of the first bonding target member 1 and the taper face 2B of the second bonding target member 2 are shown in an enlarged fashion, and the contact length (width) between these taper faces is smaller than that along which an initial area through which a bonding current with a current density necessary to induce plastic flow at the start of ring mash bonding flows is formed. Each of the taper face 1A of the first bonding target member 1 and the taper face 2B of the second bonding target member 2 may be a face usually called C-face. The taper face 1A and the taper face 2B may naturally be different in length.

While the volume of the heat capacity increasing portion 1C of the first bonding target member 1 cannot be determined unconditionally because it is affected by the magnitude of the bonding current that flows through the first bonding target member 1 and the second bonding target member 2 during ring mash bonding, the difference in melting point and volume resistance between the first bonding target member 1 and the second bonding target member 2 and so on, the heat capacity increasing portion 1C has at least the volume necessary to decrease undercut and improves the effective bonding length as described later. The length of the inclined face 1B of the heat capacity increasing portion 1C is at least equal to, typically at least 1.5 times, preferably at least twice, more preferably at least three times, the length of the taper face 2B. In other words, the inclined face 1B needs to be formed below the taper face 2B of the second bonding target member 2 corresponding to the taper face 1A when the bonding target member 1 is placed on the bonding target member 2, and its length in the direction of the central axis X-Y is preferably at least equal to, typically at least 1.5 times, preferably at least twice, more preferably at least three times, the length of the taper face 2B. The upper limit, which may be determined such that the heat capacity increasing portion 1C has such a size that it can be accommodated in the hole portion 2A of the completed bonded article, is typically at most 5 times that of the taper face 2B. The length may be larger than that, but the effect of the heat capacity increasing portion 1C does not increase remarkably. Here, the length may be determined from the standpoint of the heat capacity of the heat capacity increasing portion 1C. In this case, the heat capacity of the heat capacity increasing portion 1C defined by the inclined face 1B (including the part defined by the uninclined face when the inclination becomes zero at an intermediate point) needs to be at least equal to, typically at least 1.5 times, preferably at least twice, more preferably at least three times, the heat capacity of a hypothetical truncated cone corresponding to the taper face 2B of the bonding target member 2, in other words, a hypothetical truncated cone defined by the taper face 1A of the bonding target member 1 corresponding to the taper face 2B. The upper limit of the heat capacity may be 5 times or more of that of the hypothetical truncated cone as described above, but the range in which the effect of the heat capacity increasing portion 1C is remarkable is 5 times or less. To put it another way, the hypothetical truncated cone is a truncated cone having the taper face 2B, a circular face on the side of the smaller circle defined by the taper face 2B, in other words, the lower end face 1B of the heat capacity increasing portion 1C, as an upper face (indicated by a broken line on the lower side in FIG. 1A), and a circular face on the side of the larger circle defined by the taper face 2B as a bottom face (shown in the upper side in FIG. 1A). The diameter of the bottom face is virtually equal to the outside diameter of the bonding target member 1. The taper face 1A and the inclined face 1B extend continuously. The term "continuously" means that their inclination angles may be different (typically, their inclination angles are equal) but anything that serves as a break that inhibits conduction of heat, such as a groove, is not formed between them. No break is formed not only at the boundary between the taper face 1A and the inclined face 1B but also in the inclined face 1B in the vicinity of the boundary. This is to utilize the heat capacity of the heat capacity increasing portion 1C to the maximum.

The ring mash bonding method for bonding the first bonding target member 1 and the second bonding target member 2 with a structure as described above is next described with reference to FIG. 2. The bonding apparatus, which may be an ordinary one and is not therefore described in detail, includes, in addition to a first bond electrode 3 and a second bond electrode 4, a bonding power source 10 consisting of an AC power source 5, such as a commercial AC power source or AC power generator, a DC power source circuit 6 that converts AC into DC, an energy storage capacitor 7 consisting of a plurality of capacitors connected in parallel, a switch circuit 8 that converts the electrical energy stored in the energy storage capacitor 7 into one or more large current pulses and discharges the current pulses, such as a discharge switch or inverter circuit, and a bonding transformer 9 including a secondary winding having one or two turns and a primary winding having a much larger number of turns than the secondary winding. The first bond electrode 3 and the second bond electrode 4 are connected to the secondary winding of the bonding transformer 9. A drive mechanism or pressure mechanism that increases and decreases the distance between the first bond electrode 3 and the second bond electrode 4 and so on are omitted from illustration.

Figure 2:
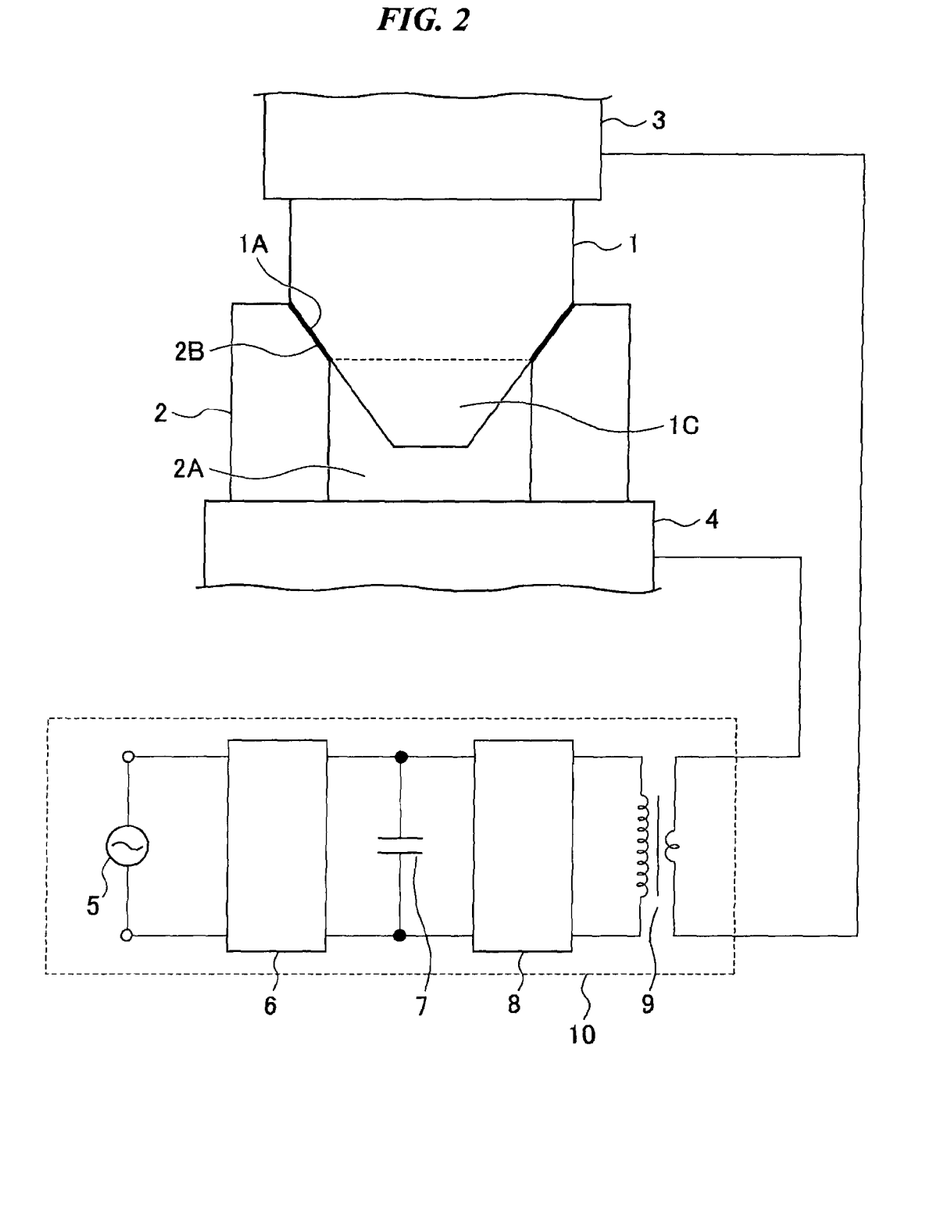
FIG. 2 is a drawing for explaining a method for manufacturing a bonded article by a ring mash bonding method according to the first embodiment of the present invention.

First, the second bonding target member 2 is placed on the second bond electrode 4 as shown in FIG. 2, and the first bonding target member 1 according to the present invention is placed on the second bonding target member 2 as shown also in FIG. 1A. At this time, the taper face 1A of the first bonding target member 1 is positioned on the taper face 2B provided at the entrance of the hole portion 2A of the second bonding target member 2 such that the central axes X-Y of the first bonding target member 1 and the second bonding target member 2 coincide with each other. In this state, the heat capacity increasing portion 1C is located in the hole portion 2A of the second bonding target member 2, and does not contact the inner face of the hole portion 2A. After that, the first bond electrode 3 is moved downward or the second bond electrode 4 is moved upward to apply a pressing force to the taper face 1A of the first bonding target member 1 and the taper face 2B of the hole portion 2A of the second bonding target member 2, and the switch circuit 8 is turned on after the pressing force is increased. Usually, the energy storage capacitor 7 has been charged to a set value by the AC power source 5 and the DC power source circuit 6 and brought into a stand-by state before the switch circuit 8 is turned on. When the switch circuit 8 is turned on, the charge stored in the energy storage capacitor 7 is discharged to the bonding transformer 9, and a bonding current with a single waveform flows through the contact surface between the taper face 1A of the first bonding target member 1 and the taper face 2B of the second bonding target member 2. The bonding current has a pulse width of approximate range of slightly less than 10 milliseconds to several dozen milliseconds, for example.

As the bonding current flows through the contact resistance between the taper face 1A and the taper face 2B, heat is generated. Then, the vicinity of the taper face 1A of the first bonding target member 1 undergoes plastic flow, and, along with this, the vicinity of the taper face 2B of the second bonding target member 2 undergoes plastic flow. As the plastic flow of them proceeds, the first bonding target member 1 is pressed into the hole portion 2A of the second bonding target member 2 and solid phase bonding proceeds. The heat generated at this time in the vicinity of the lower end of the taper face 1A of the first bonding target member 1 is also transferred quickly to the heat capacity increasing portion 1C continuing from the lower end of the taper face 1A. In particular, because the heat capacity of the vicinity of the taper face 1A of the first bonding target member 1 is larger, the temperature rise in the vicinity of the taper face 1A of the first bonding target member 1 is temporally delayed and suppressed accordingly. In this way, the effect of the heat capacity increasing portion 1C functions in the vicinity of the taper face 1A adjacent to the heat capacity increasing portion 1C, and, consequently, the effective bonding length substantially increases and the undercut becomes small compared to those in the conventional structure bonded by ring mash bonding as shown in FIG. 1B.

Figure 3:
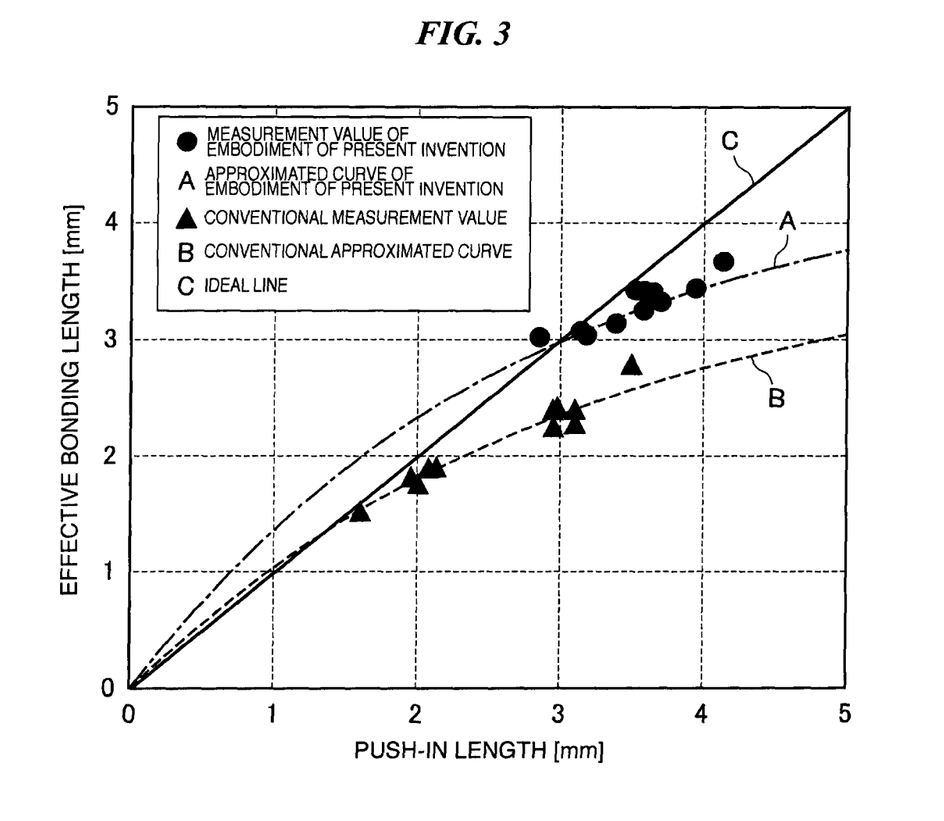
FIG. 3 is a diagram showing the relationship between the push-in length and the effective bonding length in the ring mash bonding method.

This is described with reference to FIG. 3. FIG. 3 shows the relationship between the push-in length of the first bonding target member 1 into the hole portion 2A of the second bonding target member 2 and the effective bonding length in the present invention, in an conventional case and in an ideal case. The curve A shows the relationship in the present invention, the curve B shows the relationship in the conventional case, and the straight line C shows the relationship in an ideal case. Here, the overlap allowance between the first bonding target member 1 and the second bonding target member 2 bonded by ring mash bonding in FIG. 1A and FIG. 1B is 0.5 mm, the length of the taper face 1A of the first bonding target member 1 in FIG. 1A is 1.5 mm or longer, and the length of the taper face 1A of the first bonding target member 1 in FIG. 1B is 0.5 mm. The length of the taper face 2B formed in the hole portion 2A of the second bonding target member 2 shown in FIG. 1A and FIG. 1B is 0.5 mm in both cases. In this case, the length of the inclined face 1B of the heat capacity increasing portion 1C of the first bonding target member 1 in FIG. 1A is 1 mm or longer. Here, the taper face 1A and the inclined face 1B have the same gradient.

In this ring mash bonding, the magnitudes of the bonding current and pressing force were controlled to change the push-in length of the first bonding target member 1 into the hole portion 2A of the second bonding target member 2. A microscope photograph of a cross-section of the bonded face of each bonded article was taken, and the effective bonding length was obtained from the angle of the taper face 1A of the first bonding target member 1. As a result, according to the first embodiment of the present invention, the effective bonding length can be increased to 3 mm or more, which was conventionally considered to be difficult to achieve, and the bonding strength can be improved accordingly. The bonding current has a single waveform and a pulse width of approximately several dozen milliseconds. Here, when the pulse width of the bonding current is as short as approximately several dozen milliseconds, the heat capacity increasing portion 1C produces a significant effect even when its width is approximately several millimeters or less because the ring mash bonding time is short, in other words, the heat conduction time is short. It should be noted that because the present invention aims at increasing the effective bonding length, no specific experiment was conducted on push-in lengths that produce an effective bonding length of 3 mm or less. In addition, because different results of the bonded state are produced and it is therefore difficult to obtain the same push-in length even under the same bonding conditions, the comparison is not necessarily made for the same push-in length.

Second Embodiment

The structure of the first bonding target member 1 according to a second embodiment of the present invention is next described with reference to FIG. 4A, FIG. 4B. The second bonding target member 2, which is the same as that of the first embodiment, is not specifically described. It is a feature that the heat capacity increasing portion 1C of the first bonding target member 1 also has a function of a stopper. The heat capacity increasing portion 1C has a face extending generally in the same direction as the central axis X-Y from an intermediate portion of the inclined face 1B extending with the same gradient as the taper face 1A of the first bonding target member 1. The heat capacity increasing portion 1C not only temporally delays and suppresses the temperature rise in the vicinity of the taper face 1A of the first bonding target member 1, in particular, in the vicinity of the lower end thereof, during bonding as in the case of the first embodiment but also makes the push-in length of the first bonding target member 1 into the hole portion 2A of the second bonding target member 2 uniform or constant. The ability of the heat capacity increasing portion 1C to increase the heat capacity in the vicinity of the lower end of the taper face 1A of the first bonding target member 1, which is the same as that in the first embodiment, is omitted from the explanation.

FIG. 4A shows a state before bonding. The second bonding target member 2 has been placed in a predetermined position on the second bond electrode 4, and the first bonding target member 1 has been placed on the second bonding target member 2. In this state, the taper face 1A of the first bonding target member 1 is in contact with the taper face 2B formed at the entrance of the hole portion 2A of the second bonding target member 2, and the first bond electrode 3 has not applied a pressing force to the first bonding target member 1. In this state, a lower end face 1C1 of the heat capacity increasing portion 1C formed adjacent to and integrally with a lower end 1D of the part of the taper face 1A of the first bonding target member 1 indicated by a broken line (the circular face on the side of the smaller circle of the hypothetical truncated cone) is not in contact with the second bond electrode 4 and separated from the upper face of the second bond electrode 4 by a distance H. FIG. 4B shows a state after ring mash bonding. The lower end face 1C1 of the heat capacity increasing portion 1C abuts on the upper face of the second bond electrode 4. Thus, the push-in length of the first bonding target member 1 into the hole portion 2A of the second bonding target member 2 is equal to the distance H. Because the push-in length is made uniform or predetermined, the effective bonding length is made uniform and the bonding strength is also made almost uniform. The lower end face 1C1 of the heat capacity increasing portion 1C allows a portion of the excessive bonding current flowing through the bonded portion after bonding to escape through it upon contact with the upper face of the second bond electrode 4, preventing the generation of spatter or the like.

Although not shown, when the second bonding target member 2 has a cup-like shape with a bottom, the first bonding target member 1 may have such a structure that the lower end face 1C1 of the heat capacity increasing portion 1C is separated from the bottom face in the second bonding target member 2 by a distance H. Although not shown, depending on the length of the second bonding target member 2, a protruding portion extending radially inward from an appropriate position on the inner face of the second bonding target member 2 may be formed so that a stopper function can work when a part of the lower end face 1C 1 of the heat capacity increasing portion 1C contacts the protruding portion.

Third Embodiment

In a third embodiment according to the present invention, the first bonding target member 1 is made of a metal material with a higher melting point, such as an alloy steel as described above, and the second bonding target member 2 is made of a metal material with a lower melting point, such as a cast iron. In this case, the second bonding target member 2 naturally undergoes plastic flow readily compared to the first bonding target member 1. Thus, in the third embodiment, the second bonding target member 2 has a heat capacity increasing portion 2C having an inclined face 2C1 extending from the taper face 2B of the second bonding target member 2 as shown in FIG. 5A and FIG. 5B in order to increase the heat capacity on the side of an upper end 2D of the second bonding target member 2 indicated by a broken line. The ring mash bonding method is the same as that in the first and second embodiments, and its description is therefore omitted. The heat capacity increasing portion 2C of this embodiment needs to be formed to be located above the taper face 2B of the second bonding target member 2 corresponding to the taper face 1A when the bonding target member 1 is placed on the bonding target member 2, and its length in the direction of the central axis X-Y is preferably at least equal to that of the taper face 2B. The length is typically at least 1.5 times, preferably at least twice, more preferably at least three times, that of the taper face 2B. While there is no upper limit to the length as long as the completed article has no problem, the upper limit is typically at most 5 times the length of the taper face 2B. The length may be larger than that, but the effect of the heat capacity increasing portion 2C does not increase remarkably.

As clear from FIG. 5A and FIG. 5B, the heat capacity on the upper end side of the taper face 2B of the second bonding target member 2, in other words, on the side of the upper end 2D of the second bonding target member 2 indicated by a broken line, would be obviously lower than that on the lower end side thereof without the heat capacity increasing portion 2C. Thus, the vicinity of the upper end 2D of the taper face 2B of the second bonding target member 2 readily undergoes plastic flow compared to the lower end side thereof and suffers from a large undercut. However, when an annular heat capacity increasing portion 2C is formed integrally with the upper end 2D of the second bonding target member 2 indicated by a broken line as shown in FIG. 5B, the heat capacity on the side of the upper end 2D of the second bonding target member 2 indicated by a broken line increases and the temperature rise on the upper end 2D side caused by the heat generated during bonding is suppressed. In particular, because the heat in the vicinity of the upper end portion of the taper face 2B of the second bonding target member 2 is spread quickly and transferred into the annular heat capacity increasing portion 2C, excessive plastic flow in the vicinity of the taper face 2B of the second bonding target member 2 can be prevented and undercut can be decreased. Thus, because the effective bonding length can be improved and the bonding area can be increased, the bonding strength can be increased.

In FIG. 5A, the inclined face 2C1 extending from the taper face 2B of the second bonding target member 2 has the same gradient as the taper face 2B. While the manufacturing is easier when the inclined face 2C1 has the same gradient as the taper face 2B, their gradients may not necessarily be the same from the standpoint of the function of the heat capacity increasing portion 2C. The gradient of the inclined face 2C1 is preferably larger than that of the taper face 2B. In FIG. 5B, the heat capacity increasing portion 2C has an inclined face 2C1 extending from the taper face 2B of the second bonding target member 2 and a face erecting from an intermediate position of the inclined face 2C1 in the same direction as the central axis X-Y. The heat capacity increasing portion 2C may have either shape as long as it has such a volume as to be able to decrease undercut.

While an example in which a cast iron and an alloy steel are bonded by ring mash bonding is shown in the first embodiment, the present invention is effective in bonding other metals, such as different types of metals with a difference in melting point of several hundred degrees or more by ring mash bonding. While an example is described in the above embodiments in which a heat capacity increasing portion is formed integrally with the bonding target member with a lower melting point, the effect of the present invention can be achieved even when ring mash bonding is carried out with a separate heat capacity increasing portion made of a metal material with high heat conductivity, such as copper, in contact with the bonding target member with a lower melting point if there is a restriction that does not allow a change in shape or size of the bonding target member with a lower melting point. In this case, the contact faces of the bonding target member and the separate heat capacity increasing portion are preferably clean faces from which an oxidation film or dirt has been removed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

DESCRIPTION OF REFERENCE NUMERALS AND SYMBOLS

1: first bonding target member
1A: taper face
1B: inclined face of heat capacity increasing portion 1C
1C: heat capacity increasing portion formed at lower end of first bonding target member 1
1C1: lower end face of heat capacity increasing portion 1C
1D: lower end face of first bonding target member (upper face of heat capacity increasing portion 1C)
2: second bonding target member
2A: hole portion
2B: taper face
2C: heat capacity increasing portion
2C1: inclined face of heat capacity increasing portion 2C
2D: upper end face of second bonding target member 2
3: first bonding electrode
4: second bonding electrode
5: AC power source
6: DC power source circuit
7: energy storage capacitor
8: switch circuit
9: bonding transformer
10: bonding power source

The invention claimed is:

1. A method for manufacturing a bonded article, comprising the steps of:
providing a first bonding target member;
providing a second bonding target member to be bonded to the first bonding target member, the second bonding target member having a hole portion that can receive a part of the first bonding target member;
applying a pressing force between the first and second bonding target member with the part of the first bonding target member received in the hole portion; and
applying a bonding electric current to a bonding target portion between the first and second bonding target members with the pressing force being applied thereto;
wherein the first and second bonding target members are made of metal materials with different melting points;
one of the first and second bonding target members, whichever has a lower melting point, has a heat capacity increasing portion for increasing the heat capacity thereof in the vicinity of the bonding target portion;
the one of the bonding target members has a taper face at the bonding target portion, and the heat capacity increasing portion has an inclined face extending continuously from the taper face, and a length of the inclined face is 1.5 to 5 times a length of the taper face; and the step of applying a pressing force is carried out with the other of the first and second bonding target members positioned not to contact the heat capacity increasing portion.

2. The method for manufacturing a bonded article according to claim 1, wherein the one of the bonding target members has a higher electrical resistance than the other of the bonding target members.

3. The method for manufacturing a bonded article according to claim 1, wherein a melting point of the second bonding target member is lower than a melting point of the first bonding target member;
the second bonding target member has the heat capacity increasing portion, the heat capacity increasing portion being an annular heat capacity increasing portion disposed outside the hole portion and in the vicinity of the bonding target portion to increase a heat capacity of the second bonding target member;
the second bonding target member has a taper face at the bonding target portion, and the heat capacity increasing portion has an inclined face extending continuously from the taper face, and a length of the inclined face is 1.5 to 5 times a length of the taper face; and
the step of applying a pressing force is carried out with the first bonding target member not contacting the heat capacity increasing portion.

4. The method for manufacturing a bonded article according to claim 1,
wherein the heat capacity increasing portion has a stopper function that stops displacement of the first bonding target member in the hole portion of the second bonding target member during bonding at a predetermined position.

5. The method for manufacturing a bonded article according to claim 4, wherein the heat capacity increasing portion having the stopper function has a face extending generally in a same direction as a central axis of the one of the bonding target members from an intermediate portion of the inclined face.

6. The method for manufacturing a bonded article according to claim 1, wherein a length of the inclined face is 2 to 5 times a length of the taper face.

7. A method for manufacturing a bonded article, comprising the steps of:
providing a first bonding target member;
providing a second bonding target member to be bonded to the first bonding target member, the second bonding target member having a hole portion that can receive a part of the first bonding target member;
applying a pressing force between the first and second bonding target member with the part of the first bonding target member received in the hole portion; and
applying a bonding electric current to a bonding target portion between the first and second bonding target members with the pressing force being applied thereto;
wherein the first and second bonding target members are made of metal materials with different melting points;
one of the first and second bonding target members, whichever has a lower melting point, has a heat capacity increasing portion for increasing the heat capacity thereof in the vicinity of the bonding target portion;
the one of the bonding target members has a taper face at the bonding target portion, and the heat capacity increasing portion has a face extending from the taper face; and the step of applying a pressing force is carried out with the other of the first and second bonding target members positioned not to contact the heat capacity increasing portion, wherein the heat capacity increasing portion is formed of a metal material with a good heat conductivity that is separate from the one of the bonding target members.

8. A bonded article, comprising:

a second bonding target member having a hole portion that can receive a part of a first bonding target member; and a first bonding target member bonded to the second bonding target member at a bonding target portion, with the part of the first bonding target member received in the hole portion of the second bonding target member, wherein the first and second bonding target members are made of metal materials with different melting points;

one of the first and second bonding target members, whichever has a lower melting point, has a heat capacity increasing portion that increases the heat capacity thereof in the vicinity of the bonding target portion;

the one of the bonding target members has a taper face at the bonding target portion, and the heat capacity increasing portion has an inclined a face extending continuously from the taper face, and a length of the inclined face is 1.5 to 5 times a length of the taper face; and the first and second bonding target members are positioned such that the other of the first and second bonding target members does not contact the heat capacity increasing portion.

9. A bonded article, comprising:

a second bonding target member having a hole portion that can receive a part of a first bonding target member; and a first bonding target member bonded to the second bonding target member at a bonding target portion, with the part of the first bonding target member received in the hole portion of the second bonding target member, wherein a melting point of the second bonding target member is lower than a melting point of the first bonding target member;

the second bonding target member has an annular heat capacity increasing portion disposed outside the hole portion and in the vicinity of the bonding target portion to increase a heat capacity of the second bonding target member;

the second bonding target member has a taper face at the bonding target portion, and the heat capacity increasing portion has an inclined face extending continuously from the taper face, and a length of the inclined face is 1.5 to 5 times a length of the taper face; and the first and second bonding target members are positioned such that the first bonding target member does not contact the heat capacity increasing portion.

* * * * *